Dec. 26, 1972   C. P. JAREMA ET AL   3,707,401
PLASTIC COATED METALLIC FOAMS
Filed June 21, 1971

United States Patent Office 3,707,401
Patented Dec. 26, 1972

3,707,401
PLASTIC COATED METALLIC FOAMS
Chester P. Jarema, Detroit, and Leonard M. Niebylski, Birmingham, Mich., assignors to Ethyl Corporation, New York, N.Y.
Continuation-in-part of application Ser. No. 774,756, Nov. 12, 1968, now Patent No. 3,617,364. This application June 21, 1971, Ser. No. 155,102
Int. Cl. B32b 3/26, 15/08
U.S. Cl. 117—132 B
11 Claims

ABSTRACT OF THE DISCLOSURE

The properties of articles fabricated from foamed metals (such as foamed aluminum) are enhanced by coating surfaces thereof with plastic materials, e.g., acrylonitrile-butadiene-styrene polymers. For example, the plastic coating improves the physical properties, and enables the article to be joined to another foamed metal article, or to a metal sheet, wire, glass, rock, or other material. The organic coat gives improved strength to such joint.

This application is a continuation-in-part of application Ser. No. 774,756, filed Nov. 12, 1968 and now U.S. Pat. 3,617,364.

BACKGROUND OF THE INVENTION

Foamed metals have been described in the prior art, see, for example, U.S. 2,895,819; 3,300,296; and 3,297,431. In general, such foams are prepared by adding a gas-evolving compound to a molten metal, and heating the resultant mixture to decompose the gas-forming compound to prepare blowing gas. The gas causes the metal to foam by expansion. After blowing, the resultant body is cooled to produce a foamed solid. Such gas-forming solid may be a metal hydride such as $TiH_2$, $ZrH_2$, or magnesium, aluminum, or lithium hydride, U.S. 2,983,597.

SUMMARY OF THE INVENTION

It has been discovered that foamed metal bodies produced by methods—such as generally described and referred to above—are materially enhanced by coating them with a plastic material.

For example, the coating adds strength, especially in such cases where the coating is imbibed into the surface of the metal by filling the cavities on the surface. (Such cavities can be relatively large to microscopic in size.) Second, such coatings can provide a means for attaching a foamed metal to another body. This is done by melting the plastic coating, pressing it to the surface to be attached so the molten plastic sticks to both surfaces to be bonded, and then cooling. Furthermore, the coating can be decorative. Moreover, the surface can be altered to confer different properties by a proper choice of the coating polymer. Thus, to make a more or less "slippery" surface a film of Teflon can be fused on the surface of the foamed body. To make the body elastic or "springy," a rubber can be fused thereon. To make the surface sticky, an adhesive can be used. The adhesive layer can be covered for protection prior to use by a sheet of paper, cloth, or the like.

In addition, the plastic coating can markedly improve other properties. Thus, coated plastics of this invention have less tendency to absorb liquids such as water. Compressive, flexural, shear, and tensile strength are improved; friability is decreased.

FIG. 1, which is not to scale, illustrates this invention. In FIG. 1, ABCD represents a section through a foamed metal body, said section being taken by cuts along AB, BD, and CD. The circles and partial circles within ABCD represent cross sections of bubbles in the foamed substrate. The bubbles were made by blowing gas during the foaming process. As can be seen, these bubbles can be of equal or different sizes, wholly separated, or joined together. It is not necessary that the bubbles be spherical as shown.

As illustrated, there are three cavities in Surface AC of the foamed substrate (in the illustrated section). Of course, these cavities can be formed during the blowing process and the number of cavities can be more or less in any given section.

ACFE represents a layer of plastic on Surface AC of the foamed substrate. As illustrated, the plastic layer extends into the cavities in the coated surface. This invention covers surfaces having cavities which are partially filled, substantially filled, or entirely filled.

DESCRIPTION OF PREFERRED EMBODIMENTS

Figure 1:
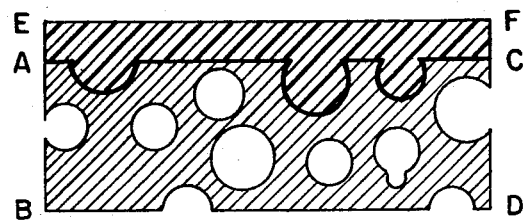

The plastics which can be used to coat foamed metals according to this invention can be chosen from a wide variety of materials.

The following illustrative but non-limiting outline serves to demonstrate what types of plastics can be used in polymer-coated foamed metals provided by this invention.

(A) Derivatives of natural products—Cellulose nitrate, cellulose acetate, cellulose acetate-butyrate, ethyl-cellulose, rubber, vulcanized rubber, chlorinated rubber.
(B) Phenolic materials—Bakelite, phenol-formaldehyde novolacs and resoles, A-stage, B-stage, and C-stage resins.
(C) Other formaldehyde-based polymers—Condensation products of formaldehyde with urea or melamine.
(D) Alkyd resins—Condensation products of alcohols such as glycerine, ethylene glycol, diethylene glycol or pentaerythritol with succinic, adipic, citric, sebacic, azelaic, phthalic, terephthalic, or maleic acid.
(E) Epoxides and phenoxy resins—Alkaline condensation product of epichlorohydrin with bisphenol A.
(F) Silicones.
(G) Furan polymers—Polymers of furfuryl alcohol or furfural, furfural-phenolics, urea-formaldehyde resins containing furfuryl alcohol.
(H) Nylons—Condensation products of diacids with diamines.
(I) Polyamides—Nylon-6.
(J) Polyurethanes—Reaction products of toluene-2,4-diisocyanate and polyhydric alcohols.
(K) Thiokols.
(L) Polycarbonates—Produced by phosgenation of dihydroxy aromatics such as bisphenol A.
(M) Polysulfones—Reaction products of bisphenol A and bis(p-chlorophenyl)sulfone.
(N) Chlorinated polyester—Produced by polymerizing 3,3-bis(chloromethyl)-1-oxacyclobutane in liquid $SO_2$ with $BF_3$.
(O) Acetal polymers—Delrin, Celcon.
(P) Polyphenylene oxide.
(Q) Polyimides—Produced by condensation of dianhydrides such as pyromellitic anhydride and polyamines such as 4,4'-diaminodiphenyl ether.
(R) Polyxylenes and polyoxyethylenes.
(S) Polyolefins—Polyethylene, polypropylene, isotactic poly-1-butene, copolymers of ethylene and vinyl acetate, methyl acrylate, propylene, and acrylic acid.
(T) Polystyrene.

(U) Vinyl polymers—Polyvinyl chloride, polymers of unsaturated esters such as methyl methacrylate, allyl esters, ethyl methacrylate, vinyl acetate, copolymers of vinyl chloride and vinylidene chloride, polyvinyl acetals.
(V) Fluorinated ethylene-propylene, tetrafluoroethylene and related fluorinated materials.
(W) Poly (alkyl vinyl ethers), polycarbazole, and polyvinylpyrrolidones.

The plastic or polymeric coating agent(s) need not be pure but in many instances are advantageously admixed with other materials. Thus, stabilizers, antioxidants, antiozonants, dyes, fillers, anti-static agents, anti-tack and slip agents, bacteriostats, brighteners, flame retardants, U.V. absorbers, and plasticizers can be used in the plastic or polymeric coats. For examples of such materials known in the art one can refer to tables in the 1968 edition of Modern Plastics Encyclopedia, McGraw-Hill, Inc., New York, N.Y. Such tables (in that publication) as those beginning on Page
(a) 503 _____ Antioxidants.
(b) 500 _____ Antistatic agents.
(c) 496 _____ Colorants.
(d) 491 _____ Organic peroxides.
(e) 466 _____ Plasticizers.
(f) 494 _____ Solvents.
(g) 510 _____ Stabilizers.
(h) 508 _____ Ultraviolet absorbers.

are incorporated by reference herein as if fully set forth. In addition, the plastic can be mixed with other substances such as silicon carbide, ground glass, or similar substance, to render the coating layer abrasive or nonskidding.

The organo-polymers can be employed singly or in combination. When used in combination, two, three, four or more of the above types of resins can be variously combined. For example, the coat can be a more or less homogeneous mixture of plastics or two or more plastics can be added to the foamed body in successive layers. Thus, laminar coats are an embodiment of the invention.

For example, the use of successive coats can form bodies having improved properties and/or bodies having acceptable properties at lower costs. Thus, the foamed metal can be first treated with a resinous material which seeps into the cavities on the surface. More particularly, this first coat can, for example, be applied as a liquid, such as a solution of a polymer in an organic solvent. Afterwards, the solvent—which facilitates seepage into the pores of the metal foam—is then allowed to evaporate, leaving the polymer coat on the foam. Alternatively, the first treatment can be with a monomer (or solution, emulsion, or suspension thereof) followed by polymerization of the monomer on (and in) the surface cavities of the foam. If the monomer is applied together with an organic solvent, the solvent can be removed either before or after the polymerization, as desired. Monomers and polymers can be added by spraying, dipping or rolling.

Continuing the building of a laminar coat, other layers of the same or different polymeric materials can be overlaid on the first coat.

In addition to polymeric materials, other types of substances can be overlaid on the first layer.

Thus, for example, one or more layers of a plastic, such as a phenol-formaldehyde resin, can be applied to a foamed aluminum sheet. Next, a sheet of aluminum foil is bonded to the plastic coating, and then (optionally) overlaid with another layer of plastic. Next, a paper is bonded to the article—which paper optionally has a decorative design on the upward surface. The paper is then coated with a transparent, resistant plastic coat which protects the paper design from $H_2O$, air, etc. The resultant foamed sheet is useful as a building panel "sandwich" wherein the foamed aluminum portion provides lightweight, structural strength and the coated paper surface yields an aesthetically pleasing decorative effect. Such sandwich composite can be used for interior or outer walls.

The layers of materials built up on a coated, foamed metal body of this invention need not be wholly integral. For example, such layers built up on the coated surface can be a plastic foam. The coated surface provides a better bond between the foamed plastic and the foamed metal.

Thus, for example, one or more layers of a plastic, metal sheet is coated with a polymeric coat which is imbibed into the foam surface and forms a relatively smooth surface on the foamed body. This is then overlaid with a tacky overcoat of adhesive material so that the adhesive surface is exposed.

Next (temporary, if desired), sides are provided around the metal sheet so said sheet forms with the sides, an open box-like structure with the adhesive surface being exposed "in" the box. (In other words, the bottom of the box-like structure is the foamed metal sheet.) Then, a foamable plastic composition is placed on the adhesive surface to the desired depth, the sides serving to confine the foamable composition so there is minimal spillage. Thereafter, the plastic composition is allowed to foam and the adhesive surface provides a bond between the plastic and metal foams. The plastic foam can be flexible, rigid, or semirigid as desired.

Figure 2:
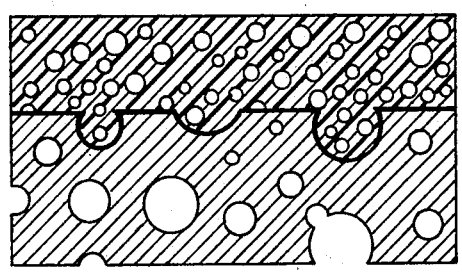
FIG. 2 is a cross section of foamed plastic coated foamed metal.

FIG. 2 shows a cross section of a foamed plastic coating on a foamed metal body. The plastic foam has penetrated the exposed pores of the foamed metal.

It is not necessary to pre-coat the foamed metal with an adhesive before applying the foamed plastic coating. The foamed plastic coating can be applied by merely placing a foamable plastic composition directly on the foamed metal surface and allowing it to foam. This is illustrated by the following examples.

EXAMPLE 1

A piece of foamed aluminum (15 pounds per cubic foot) was sectioned to provide a surface with a large number of open pores. A freshly prepared foamable polyurethane solution was poured on the sectioned surface (a mixture of 18 parts toluene diisocyanate, 8.8 parts trichloromethane, 0.12 part trimethyl piperazine, 0.1 part dibutyl tin laurate, and 27 parts of a pentaerythritol-propylene oxide condensate with a molecular weight of 450). After a few seconds the composition foamed to a depth of about 1", providing a foamed aluminum panel with an insulating layer of polyurethane foam integrally bonded to it.

EXAMPLE 2

A piece of sectioned foamed aluminum slab was coated to a depth of about 0.125" with expandable polystyrene beads (Dylite F-40, Koppers Company, Inc.). A flat plate was positioned 1" above the sectioned aluminum surface. Steam was passed between the foamed aluminum and the flat plate, causing the polystyrene beads to expand, filling the void between the foamed aluminum surface and the flat plate. On expanding, the beads fused, resulting in a foamed aluminum panel coated with an insulating layer of polystyrene foam. The polystyrene foam was bonded tightly to the foamed aluminum surface principally due to the physical penetration of the fused polystyrene into the surface pores.

These composite plastic and metal foams have many desirable utilities. Thus, they can be used in the walls of vehicular compartments. When so used, the metal foam is "outside" while the plastic foam is on the inside. With such configuration, the metal foam can pick up much shock should there be an impact. The plastic foam on the inside has more "give" than the metal foam, and it better protects freight or passengers inadvertently jostled against the compartment walls during impact.

Moreover, composite plastic metal foams can be used as flooring. In this instance, the foamed metal provides structural strength. The plastic foam adherent thereon is a built-in pad for carpeting. If desired, the plastic foam surface can have the carpeting pre-bonded thereto, and/or, non-coated surfaces of the metal foam body can have tongues and grooves (or some other surface configuration) provided to facilitate laying.

Of course, more than one surface of the metal foam can have a plastic foam bonded thereto. Thus, for example, opposing surfaces can be provided with an adherent plastic foam to form a "sandwich-like" structure.

Illustrative but non-limiting plastic foams which can be bonded to a metal foam according to this invention are polystyrene (expanded beads), polyurethanes, and vinyl-containing foams such as described in Alzner et al., and Klopfer, U.S. 3,338,845, and 3,338,846, respectively.

As illustrated above, polymeric coats applied to foamed metals according to this invention can be used as bonding agents to bond other materials to a foamed metal article. According to one embodiment of this invention, the material so bonded need not provide a uniform surface. Thus, for example, a polymeric coat which is meltable can be applied to a surface of the foamed metal article. This can then be melted to form a tacky surface. Into this, crushed rock can be embedded and the surface then cooled to form a foamed metal article having an irregular surface provided by the crushed rock "coat." These articles provide a new artistic medium. Moreover, by varying the colors of the crushed rock, foamed metal sheets can provide an extremely eye-pleasing wall unit. As desired, the color pattern of such curtain walls can be chosen to provide a "checkerboard," variegated, mosaic, or combined effect.

Curtain walls and other structural units made from plastic coated metal foams according to this invention need not have surfaces unaffected by atmospheric or environmental conditions. In fact, this invention encompasses embodiments where changes due to the environment are used advantageously. Thus, one embodiment of this invention comprises a foamed metal structural unit having a plastic coating thereon containing a phosphorescent or fluorescent material. Such structural units glow in the dark after being exposed to light or fluoresce. Compounds such as acridine dyes, Rhodamine B and Rhodamine 6G as well as other materials discussed in Kirk-Othmer's Encyclopedia of Chemical Technology, 2nd Edition (in the section under "Luminescent Materials"), can be used.

In addition, electrically conducted wires can be embedded into the plastic layer attached to the foamed substrate. This provides a curtain wall panel which can be used to heat a room by radiant heat when electric current is called to flow through the resistance wires.

Similarly, materials which change color upon exposure to different amounts of moisture can be stuck in the plastic coat and exposed to the environment. Salts such as cobaltous chloride and bromide can be used in this manner.

As mentioned previously, the plastic coating can be applied to the metal as a solution of a polymer in an organic solvent. Likewise, colloidal suspensions, called "sols," of the polymer in a liquid medium can be employed in a similar manner. Useful solvents include aromatic hydrocarbons such as benzene, toluene, and the like; alcohols such as methanol, ethanol, isobutanol, and the like; ketones such as acetone, methylethyl ketone, diethyl ketone, and the like; ethers such as tetrahydrofuran, dioxane, diethyl ether, and the like; halohydrocarbons such as methylene chloride, 1,1,1-trichloroethane, perchloroethane, and the like. Sols can be readily prepared in water. Methods of making such solutions and sols are well known. Examples of plastics that can be applied in this manner include acrylonitrile-butadiene-styrene terpolymer (ABS resin), polyethylene, polyesters such as phthalic acid-glycol esters, polyvinyl chloride, and the like, including those previously listed. The following examples illustrate the application of a plastic coating using the above process.

EXAMPLE 3

A solution of ABS resin in tetrahydrofuran was prepared. The solution was applied to a foamed aluminum body by brush application. The solvent was allowed to evaporate, leaving a thin coating of ABS resin on the foamed aluminum.

EXAMPLE 4

A milky appearing sol of polyethylene in butyl alcohol was prepared by adding polyethylene powder to butanol and stirring the mixture. The resultant sol was brushed onto a section surface of foamed aluminum such that the sol flowed into the exposed pores. The butanol was evaporated, leaving a foamed aluminum body coated on one surface with polyethylene.

A plastic layer can be applied to the foamed metal body by cold molding. According to this technique, an organic composition is admixed with a phenolic resin dispersed in a solvent. This is admixed with a filler such as asbestos fibers, silica, or magnesia. The resultant mass, where possible, is preshaped to the approximate shape of the finished article. Next, the composition and the foamed metal body is put into a mold. The composition and foamed metal substrate is then pressed together under pressure to bond the polymeric-containing material to the foamed metal substrate. There is no heating or cooling cycle.

Alternatively, a plastic layer can be applied by hot compression molding. This technique is best employed for thermosetting compositions, because thermoplastic materials require cooling before removal of the article and preheating before receiving the next charge. This adds to expense because of the time lost.

In general, the charge and the foamed metal substrate are placed in a heated mold, the mold is closed, generally under low pressure, until pressure is exerted on the material. The charge becomes plastic and under increased pressure is forced to fill cavities in the surface of the foam substrate. The molded article is kept under pressure until cured. After that, the mold is opened and the molded part removed.

The charge is usually beads, scraps, granules, or it may be tableted or preformed. Preforming is advantageous when flow is poor, such as with polytetrafluoroethylene.

The charge can be preheated prior to insertion in the mold. Electronic, steam, and air preheating are art-recognized methods. Molding is usually carried out at 145–380° C. More preferably, temperatures from 145–200° C. are used. The pressure utilized can be from, say, 300–800 p.s.i.g.; usually it is best to use pressures from 500–5000 p.s.i.g. Low pressures can be used while the mold is being closed and higher temperatures can be used during molding.

Transfer molding techniques such as those described on pages 587–589 of Golding, Polymers and Resins, D. Van Nostrand Co., Inc., New York (1959), can be used.

All types of foamed materials can be used as substrates for this invention. However, a highly preferred embodiment is plastic-coated foamed aluminum. The aluminum can be alloyed with various metals. Thus, it can contain up to about 50 percent of magnesium, manganese, or copper. Foamed aluminum containing up to about 10 weight percent lead alloy therewith is a preferred embodiment because such foamed aluminums have superior sound-dampening properties.

The following alloys yield foams suitable for this invention when used in a process employing a titanium or zirconium hydride as a blowing agent. Suitable techniques are the processes of the prior art set forth in the patents cited herein in the section "Background of the Invention." Moreover, said alloys yield suitable foams when the molten alloy is made more viscous by a suitable viscosity-increasing agent.

Alcoa alloy—
- 7075 (1.6% Cu, 2.5% Mg, 0.3% Cr, 5.6% Zn, remainder Al)
- 2024 (4.5% Cu, 0.6% Mn, 1.5% Mg, remainder Al)
- 5086 (0.45% Mn, 4.0% Mg, 0.1% Cr, remainder Al)
- 6063 (0.4% Si, 0.7% Mg, remainder Al)
- Almag 35 (6–8% Mg, in Al)
- 1000 series Al (99.6% minimum Al)
- 2011 (5.5% Cu, 0.5% Pb, 0.5% Bi, remainder Al)
- 2218 (4.0% Cu, 1.5% Mg, 2% Ni, remainder Al)
- 3005 (1.2% Mn, 0.4% Mg, remainder Al)
- 4042 (12.2% Si, 0.9% Cu, 1.1% Mg, 0.9% Ni, remainder Al)
- 4043 (5% Si, 95% Al)
- 8280 (1.5% Si, 1.0% Cu, 0.5% Ni, remainder Al)
- Magnalium (70% Al, 30% Mg)

An especially preferred embodiment is a plastic coated foamed metal body in which the foamed metal has a density less than about 38 percent of the density of the same non-foamed metal. For example, aluminum has a density of about 170 pounds per cubic foot and, hence, in this preferred embodiment, foamed aluminum having a density up to about 65 pounds per cubic foot is used. The usefulness of the plastic coated foamed metal is enhanced still further using foamed metals of even less density below about 20 pounds per cubic foot.

EXAMPLE 5

The following is a general procedure illustrating preparation of plastic coated metal foams by a hot compression molding technique.

A sample of a foamed aluminum having a density of 10–40 percent of the density of aluminum ingot is employed. Such samples have approximate dimensions of 6" x 2" x 1". At least one of the 6" x 2" surfaces is characterized by having a "pitted" configuration. Such pitted configuration can be gained by preparing the sample by making a section through a foamed aluminum body of said density wherein the pore size averages $\frac{1}{16}$–$\frac{3}{32}$ of an inch and the pore size of, say, 80 percent of the pores ranges from about $\frac{1}{8}$" to about $\frac{1}{64}$".

From 5–15 grams of acrylonitrile-butadiene-styrene resin is placed on the 6" x 2" surface above described. (A resin used was Tybrene 27, Natural 7 supplied by Dow Chemical Company. Such plastic is a solid in pelletized form.) Where desired, the pellets are admixed with approximately 2 percent by weight of a dye. Dyes found suitable are the following, supplied by Allied Chemical Corporation.

| | |
|---|---|
| BC 70920 | Plasto blue G. |
| BC 70921 | Plasto blue RDA. |
| BC 70922 | Plasto green B. |
| BC 70923 | Plasto orange R. |
| BC 70924 | Plasto red B. |
| BC 70925 | Plasto yellow MGS. |
| BC 70926 | Plasto yellow Y. |

The foamed metal substrate, plastic (and dye) are placed in a hydraulic press whose 6" x 6" platens have previously been heated to 475–500° F. The material is so placed in the press that the plastic (and dye) is on top. Between the top platen and the pellets is placed a covering sheet of a somewhat heavy gauge aluminum foil, say, 15 mils thick. The press is barely closed, say, to about 50 pounds per square foot, and allowed to remain in this configuration for about 3–5 minutes. In this manner the hot top platen heats the plastic.

Thereafter, additional pressure can be applied, say, an additional 10–50 lbs./sq. foot, to cause the plastic to melt and flow over the entire top surface of the foamed aluminum. When the entire top surface is covered with the plastic, the plastic-coated foam is removed from the press. This yields a plastic-coated foam to which is attached the heavy foil.

This object is then cooled, optionally with water or other coolant such as Dry Ice. The aluminum foil can be removed, if desired.

Using about 5 grams of resin on the surface above described yields a coated foam having a thin coat of plastic thereon. In other words, the tops of the walls of the pore surfaces are visible through the plastic. This gives an aesthetically pleasing effect similar to a cloisonné, with most of coat embedded into the surface cavities of the foam filling them up to make a smooth surface. Of course, more plastic than 5 grams yields a thicker coat on the surface of the metal foam.

The process described above lends itself well to scale-up. Thus, larger coated foamed bodies can be made to order if comparatively larger amounts of plastic (and dye) are employed between larger platens on bigger samples of substrate.

The above procedure has been extended to a thermosetting melamine resin. The platen temperature was 375° F. About 5 g. of undyed melamine resin was used and the resultant plastic-coated foam surface was white-gray having a marble-like appearance.

Similarly, the above procedure was applied to a methacrylate resin which had been admixed with a hardener. A clear plastic coat was obtained.

Similarly, the polypropylene coat was laid down using a platen temperature of 400° F.

In the cases where the above technique was employed, the polymeric material had filled cavities in the treated surface.

Utilizing the low pressures employed in this example, coated materials were made from other samples of foamed aluminum in which the cavities were larger than those mentioned above. In one instance, the cavities, in general, were from $\frac{3}{32}$"–$\frac{5}{32}$" in size. Utilizing this material a commensurately greater amount of plastic was employed.

In instances where the above general procedure was employed, visual inspection demonstrates that the cavities in the surface so treated are well filled with plastic material to depths of the cavities present in the surface.

For much smaller cavities, it is expedient to increase the compression and/or temperature pressure to force the plastic to flow into the smaller pores. Pressures in the range of 10–200 p.s.i.g. are advantageously employed. Usually, it is preferred to use a pressure less than that which compresses the foamed substrate, but higher pressures can be employed if desired to materially alter the treated surface by admixing the plastic coat with a crushed foam surface.

EXAMPLE 6

A liquid polyester resin (Michigan Fibreglas Sales, Inc., No. 130) was admixed with a hardener (Michigan Fibreglas Sales, Inc., EH No. 37) in the ratio of four parts resin to one part hardener. This was then spread upon a foamed aluminum sample having a pore size of from about $\frac{1}{16}$ to about $\frac{1}{32}$ as described in Example 1. (Brushing, rolling, or spraying are suitable application techniques.) After application, a fiberglass mat was placed on the resin surface and the resin allowed to harden. After drying, another coat of resin was applied to the top of the fiberglass. This was allowed to dry and was sanded. Additional layers of resin and fiberglass can be applied before or after sanding.

Figure 3:
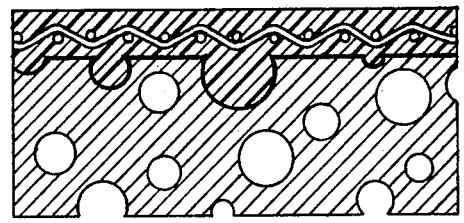
FIG. 3 is a cross section of a fiber mat reinforced plastic coated foamed metal body.

The above example illustrates the preparation of a fiber reinforced plastic coated foamed metal body as shown in FIG. 3. Similar procedures can be used to prepare other fiber reinforced plastic coatings. A broad range of fiber reinforcing material can be used such as graphite fiber, fiberglass, Kao-Wool fibers, aluminized graphite fibers, zincated graphite fibers, refractory fibers such as potassium titanate, silicon carbide, alumina, boron nitride, titanium carbide, titanium oxide, metal coated refractories, and metal fiber such as titanium fiber, nickel fiber, iron fiber, nickel-plated iron fiber, steel fiber, aluminized steel fiber, and the like. Likewise, the technique is readily applied to different plastic coatings including epoxy resins, polyurethanes, melamines, ABS, polycarbonates, polyacetals, polyphenylene ethers, and the like. For example, an epoxy resin and hardener can be substituted for the polyester resin used in Example 6 to prepare a foamed aluminum coated with a fiberglass reinforced epoxy resin. The fiberglass need not be in mat form but can be random fiberglass. Substitution of graphite fiber yields graphite fiber reinforced polyester coated aluminum foam. If epoxy resin is employed the product is graphite fiber reinforced epoxy coated aluminum foam.

A useful method of preparing the fiber reinforced plastic coated metal foam is to lay on the foamed metal surface a sheet of plastic film pre-impregnated with reinforcing fiber and press the reinforced film against the foamed metal surface. In this embodiment, the plastic film is preferably an incompletely cured thermosetting resin such as a fiberglass of graphite fiber reinforced polyester or epoxy film containing a curing agent. Such pre-impregnated films are available commercially ("Fiberite" (TM) pre-preg. tape, West Coast Corp., Orange, Calif., and "Scotch-Weld" (TM) structural film, 3M Company, Minneapolis, Minn.). They are applied to the foamed metal body by placing the fiber impregnated film on the foamed metal body and pressing it against the metal body while heating it to a curing temperature (300–450° F.) until the film is cured.

The following example illustrates the preparation of a fiberglass reinforced epoxy coated foamed aluminum.

EXAMPLE 7

On each broad surface of a foamed aluminum (density 16.4 pounds per cubic foot) slab (2.5" x 12" x .75") was placed a sheet of fiberglass cloth impregnated with a thermosetting epoxy laminate adhesive. The slab with the impregnated glass cloth in place was placed between the platens of a press. A pressure of 165 p.s.i. was applied and the platens heated to 250° F. and held at that temperature for one hour. They were then cooled and the pressure released. The fiberglass reinforced epoxy coated aluminum foam was removed. The strength of the coated foamed aluminum was greatly increased. This was measured by placing the coated foamed aluminum slab across a 10" span and placing a load at the center. Uncoated foamed aluminum of this dimension will fail at around 30 pounds. The foamed aluminum coated with fiberglass impregnated epoxy did not fail until the load reached 278 pounds, at which point its deflection was 2.85 percent of span.

EXAMPLE 8

This example gives an illustrative general procedure for preparing a plastic coated metal foam having items embedded in the plastic layer.

Foamed aluminum samples are prepared as in Example 1, utilizing 5–15 g. of ABS resin on a 6" x 2" foamed metal surface.

Thereafter, the coated material (coated side up) is put back in the press which has the platens preheated to a temperature which will soften the plastic coat. A suitable platen temperature is 475–500° F.

After the plastic coated material is softened, a material to be embedded in the plastic coat is placed on the softened surface. Illustrative substances are quartz, marble, or enamel chips, crushed rock, metal flakes, wires, or turnings and glass wool, or beads. Pressure of 10–100 pounds per square foot is then impressed, forcing the substance to embed in the coat. Pressure is released and the resultant object allowed to cool.

Using the above procedure, two foamed aluminum bodies can be joined by placing one body into a softened coat on another body. In this way, plastic is between the butted surfaces. Foamed aluminum bodies can also be joined using plastic coats on top, bottom, and/or sides of both conjoined bodies with plastic between or not present between the butted surfaces as desired.

EXAMPLE 9

Some foamed metal samples have a large number of open cells and/or small imperfections in the walls of apparently closed cells. These allow fluid to penetrate freely from surface cavities into the body of the foamed metal. Utilizing such samples, plastic coats can be applied which penetrate to any desired depth in the foamed body.

This is illustrated by the following procedure. A mixture of Polyclear, an acrylic substance supplied by Transene Co., Inc., of Rowley, Mass., is mixed with a hardener as directed by the supplier. If this mixture is immediately applied to foamed aluminum having small imperfections in the cell walls, the quite fluid mixture will penetrate to about 70 percent of the depth of a one-inch thick foam before hardening. Alternatively, if the mixture is allowed to set up for about 15 minutes before application, the penetration is lessened by 20–30 percent.

If the mixture is allowed to set up for longer periods, the penetration can be further lessened.

Carvable epoxy coats can be made from slurries of epoxy resins coated on foamed metals. The epoxy-foam composite can be used for tooling needs such as for numerical control cutting machines.

A particularly preferred embodiment of the invention is a foamed aluminum body having a density of from about 0.2–1.0 grams per cc. (about 12–65 pounds per cubic foot) having a surface thereof coated with a plastic coating wherein the plastic has a density of from about 0.9–2.7 grams per cc. In this manner, a panel can be made which has all the surface properties of the plastic coating such as resistance to chemical attack and water imperviousness, and, at the same time, has strength greater than even the foamed aluminum. In order to obtain this combination of properties with the plastic alone a much heavier panel would be required.

Another feature of this particularly preferred embodiment of the invention is that it enables the manufacture of articles having a resultant density of less than one and having surface properties of a plastic which has a density of greater than one. Such articles have the desirable surface properties of the plastic and the high strength of the foamed aluminum and will float in water. They find applications in areas such as in the manufacture of surfboards.

The following example illustrates the preparation of a fiberglass reinforced ABS coated foamed aluminum panel.

EXAMPLE 10

A fiberglass mat was placed on a sectioned surface of foamed aluminum. ABS pellets were uniformly distributed over the mat. Aluminum foil was placed over this and the structure placed between the heated platens of a press. A pressure of about 150 p.s.i. was applied and the platens heated to 500° F. After 10 minutes, the platens were cooled and the pressure released, giving a foamed aluminum panel having a surface coated with fiberglass reinforced ABS.

A series of fiberglass reinforced polyester and epoxy coated foamed aluminum panels of varying thickness were prepared following the procedure of Example 7 and their load bearing properties determined. The panels were 2.5" x 12" and were coated on both broad surfaces with a 32 mil coating. The results were as follows:

10" Span Failure Load (lbs.)

| Panel thickness | Bare foam | Fiber glass reinforced | |
|---|---|---|---|
| | | Polyester | Epoxy |
| 0.25" | <10 | 55-60 | 85-90 |
| 0.375" | 10-13 | 80-90 | 165-180 |
| 0.50" | 20-25 | 190-240 | 275-300 |
| 0.75" | 45-60 | 315-380 | 495-525 |
| 1.00" | 90-110 | 475-500 | 680-710 |

These results demonstrate the large increase in load bearing properties of the coated foamed aluminum.

Further tests were carried out relating the load bearing properties of the foamed aluminum panel to the thickness of a fiberglass reinforced polyester coating. The results with a 0.63" thick foamed aluminum panel 2.5" x 12" were as follows:

| Coating thickness (mils): | 10" span failure load (lbs.) |
|---|---|
| 5 | 96-120 |
| 15 | 195-214 |
| 25 | 265-308 |
| 32 | 285-350 |
| 50 | 455-505 |
| 64 | 600-625 |

Another series of 0.75" thick foamed aluminum panels with varying coating thicknesses was made using a fiberglass reinforced epoxy coating made using the pre-impregnated fiberglass as shown in Example 7. The "prepreg." sheet used in making the panel was a commercial product of 3M Company ("Scotch-Weld" fiberglass reinforced epoxy film AF-114). The results were as follows:

| Sheet thickness (mils): | 10" span failure load (lbs.) |
|---|---|
| 5 | 110-125 |
| 17 | 255-278 |
| 34 | 580-660 |

The above results demonstrate the high strength of the plastic coated foamed aluminum bodies of the present invention.

We claim:

1. As an article of manufacture, a foamed metal body having a surface thereof coated with a fiber reinforced organopolymeric plastic.

2. An article of claim 1 wherein said foamed metal body is foamed aluminum.

3. An article of claim 2 wherein said fiber is fiberglass.

4. An article of claim 2 wherein said plastic is an epoxy resin.

5. An article of claim 2 wherein said fiber is graphite fiber.

6. An article of claim 5 wherein said plastic is an epoxy resin.

7. As an article of manufacture, a foamed metal body having a density below about 38 percent of the density of the non-foamed metal and having a surface thereof coated with an organopolymeric plastic coating.

8. An article of claim 7 wherein said foamed metal is foamed aluminum.

9. An article of claim 8 wherein said density is below about 20 pounds per cubic foot.

10. An article of claim 8 wherein said plastic has a density of from about 0.9-2.7.

11. An article of claim 9 wherein said plastic has a density of from about 0.9-2.7.

References Cited

UNITED STATES PATENTS 3,617,364  11/1971  Jarema et al. _____ 161—160

WILLIAM J. VAN BALEN, Primary Examiner

U.S. Cl. X.R.

117—127, 132 BE, 132 BF, 132 BS; 161—160, 167, 183, 189, 190, 207, 214, 215, 218

UNITED STATES PATENT OFFICE
CERTIFICATE OF CORRECTION

Patent No. 3,707,401                  Dated December 26, 1972

Inventor(s) Chester P. Jarema et al.

It is certified that error appears in the above-identified patent and that said Letters Patent are hereby corrected as shown below:

The term of this patent subsequent to

November 2, 1988, has been disclaimed.

Signed and sealed this 20th day of May 1975.

(SEAL)
Attest:

RUTH C. MASON
Attesting Officer

C. MARSHALL DANN
Commissioner of Patents
and Trademarks